(No Model.) 5 Sheets—Sheet 1.

A. DAHLSTROM.
SELF WAITING TABLE.

No. 401,820. Patented Apr. 23, 1889.

WITNESSES:  
INVENTOR.  
A. Dahlstrom  
BY  
ATTORNEYS.

(No Model.) 5 Sheets—Sheet 3.

A. DAHLSTROM.
SELF WAITING TABLE.

No. 401,820. Patented Apr. 23, 1889.

WITNESSES:
Fred G. Dieterich
Solon C. Kemon

INVENTOR,
A. Dahlstrom
BY Munn & Co.
ATTORNEYS.

(No Model.) 5 Sheets—Sheet 4.

A. DAHLSTROM.
SELF WAITING TABLE.

No. 401,820. Patented Apr. 23, 1889.

WITNESSES:
Fred G. Dieterich
Leon O. Kenron

INVENTOR.
A. Dahlstrom
BY Munn & Co
ATTORNEYS.

(No Model.) 5 Sheets—Sheet 5.

A. DAHLSTROM.
SELF WAITING TABLE.

No. 401,820. Patented Apr. 23, 1889.

WITNESSES:
Fred G. Dieterich
Colon C. Kemon

INVENTOR,
A. Dahlstrom
BY Munn & Co
ATTORNEYS.

UNITED STATES PATENT OFFICE.

ANDREW DAHLSTROM, OF ASHTON, MICHIGAN.

SELF-WAITING TABLE.

SPECIFICATION forming part of Letters Patent No. 401,820, dated April 23, 1889.

Application filed April 7, 1888. Serial No. 269,897. (No model.)

*To all whom it may concern:*

Be it known that I, ANDREW DAHLSTROM, of Ashton, in the county of Osceola and State of Michigan, have invented new and useful Improvements in Self-Waiting Tables, of which the following is a specification, reference being had to the accompanying drawings, which form part thereof, and in which similar letters of reference denote like parts in all the figures.

The object of my invention is to produce a substantial self-waiting table which will be positive in its operation, easy to manipulate, and which, when in its operative condition, will present a neat and ornamental appearance.

My invention consists in combining with a main table a supplemental or revolving table and a suitable spring-operating gearing disposed within said main table, arranged to operate the revolving table; and it further consists in the peculiar construction and combination of parts, as will hereinafter be fully described, and particularly pointed out in the claims.

Figure 1:
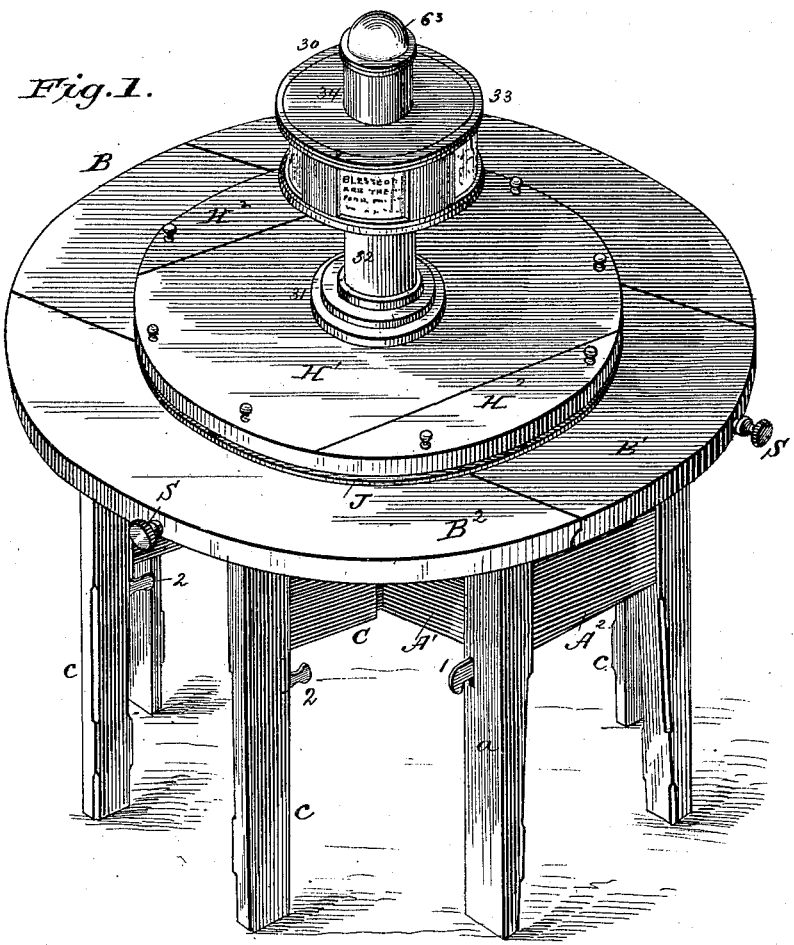
Figure 2:
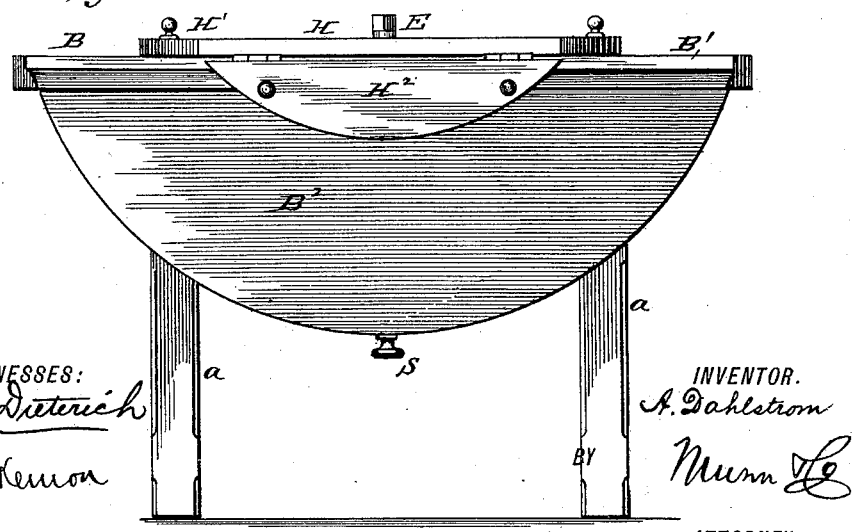
Figure 3:
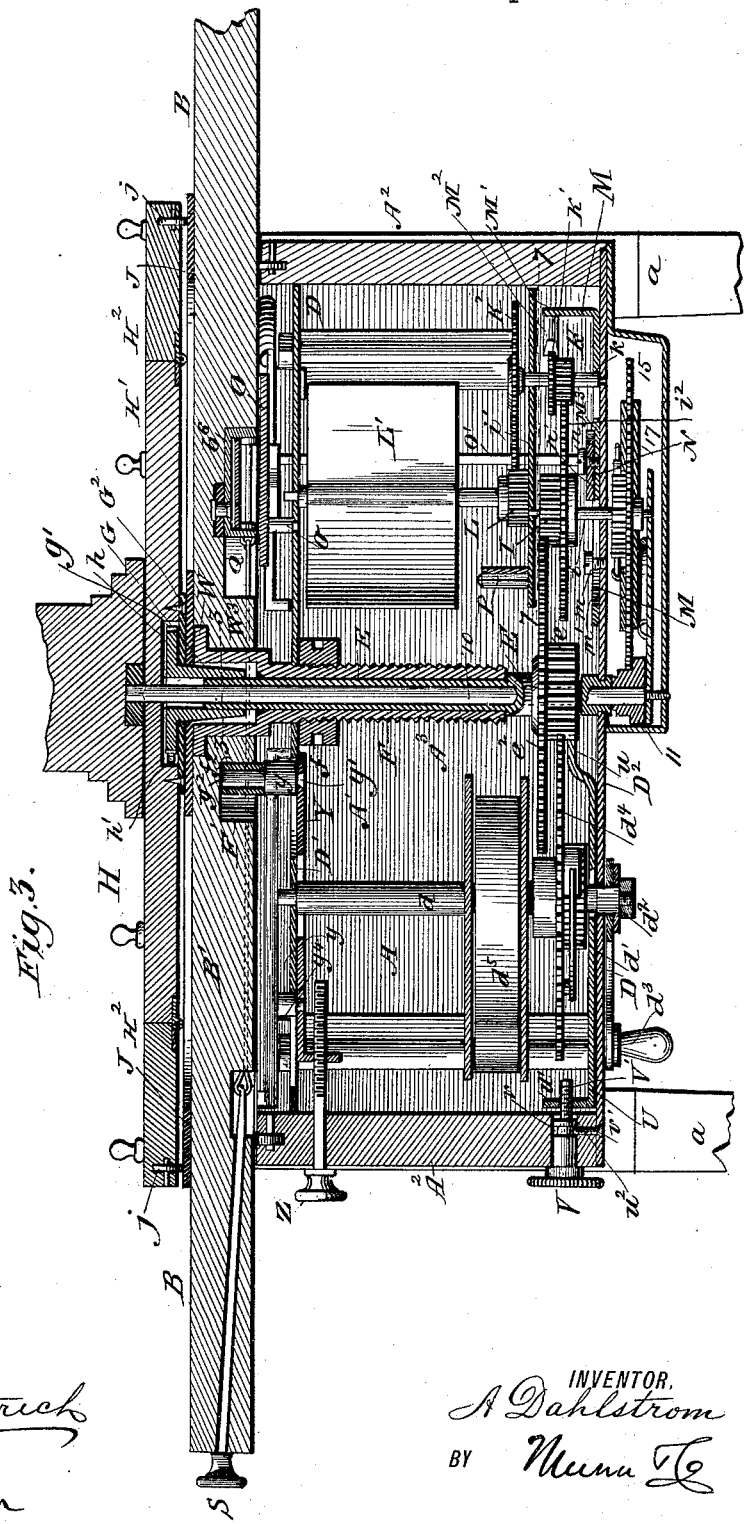
Figure 4:
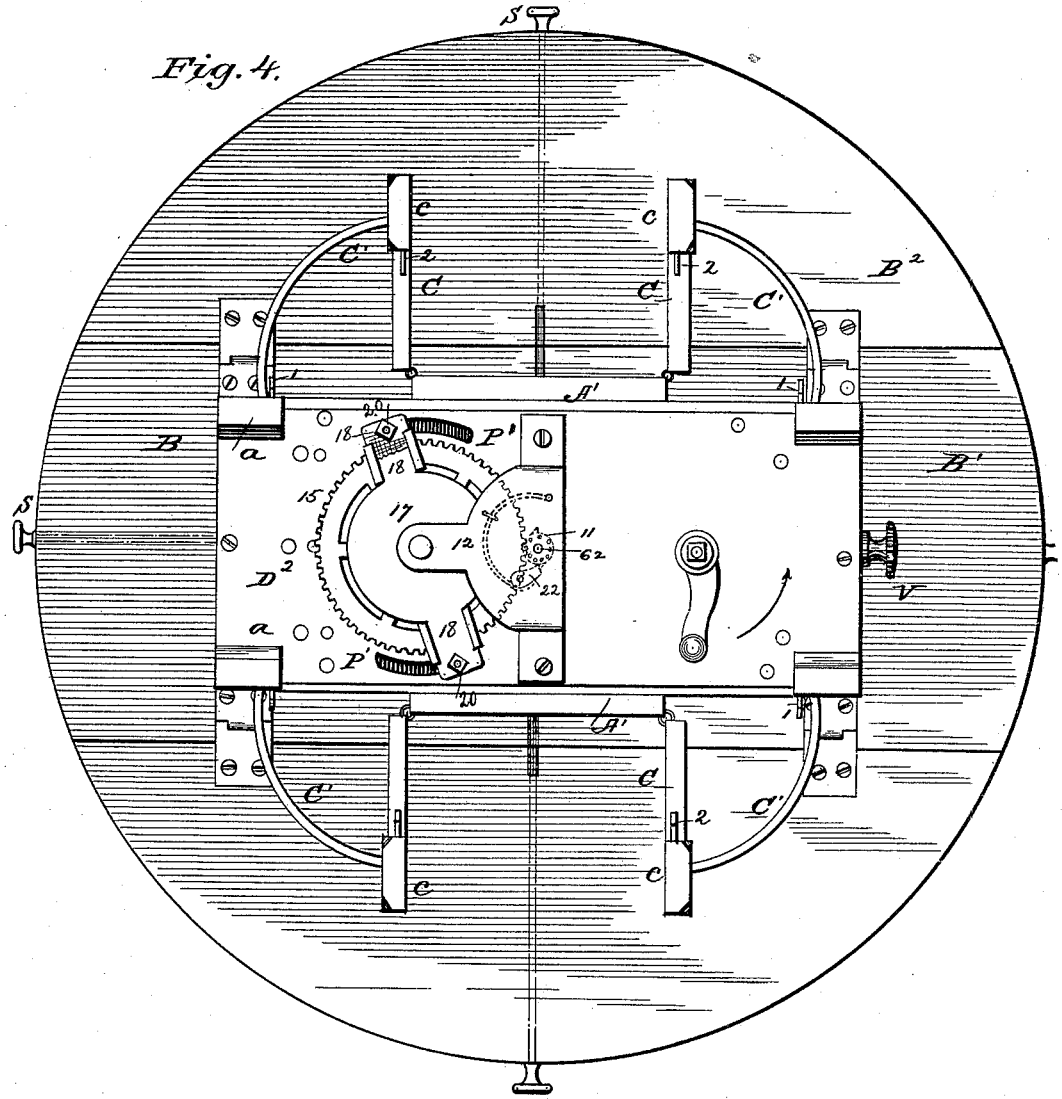
Figure 10:
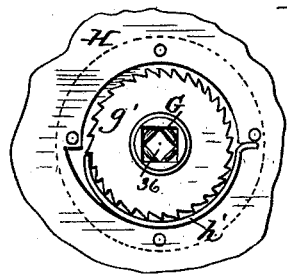
Figure 5:
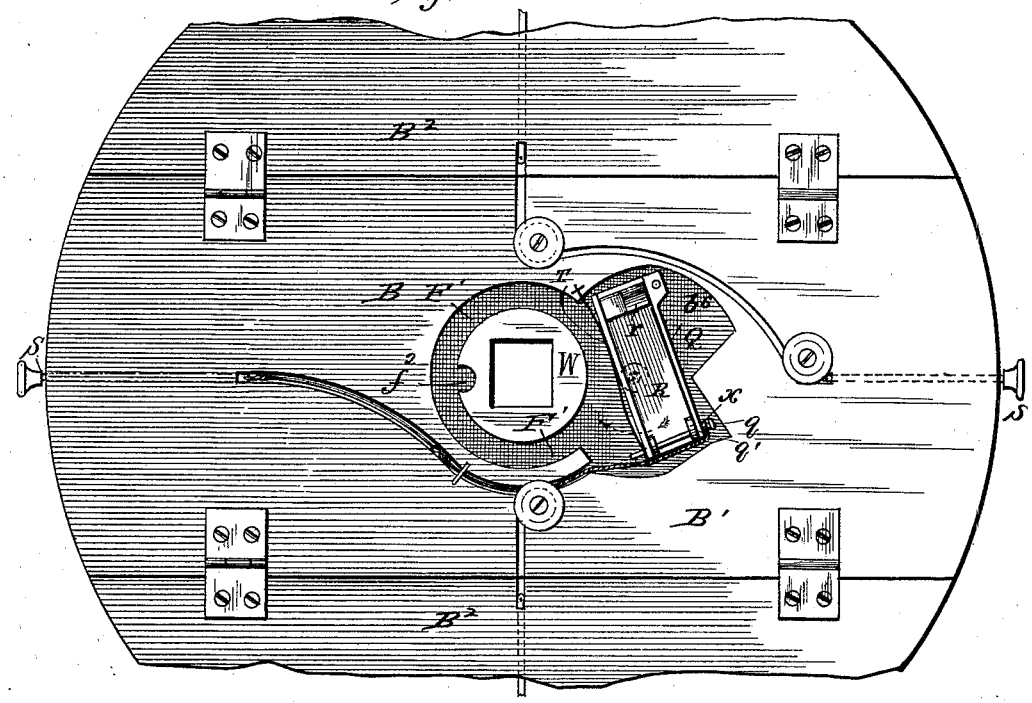
Figure 6:
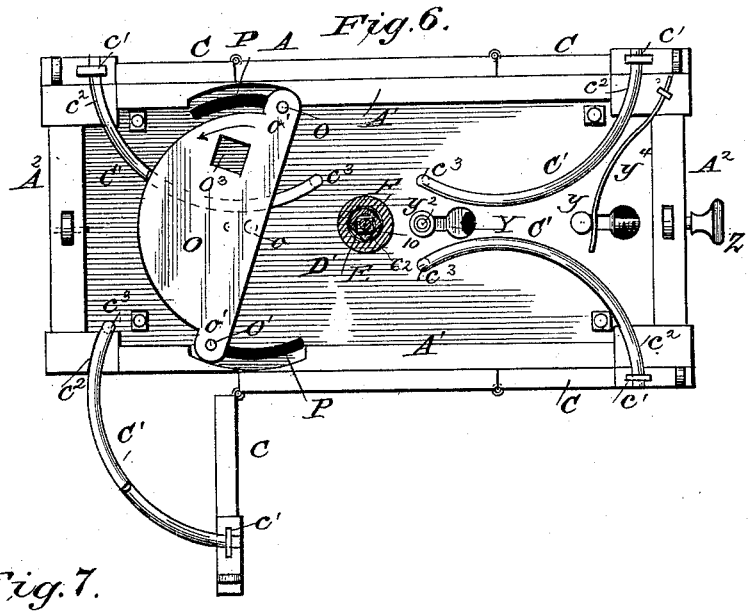
Figure 7:
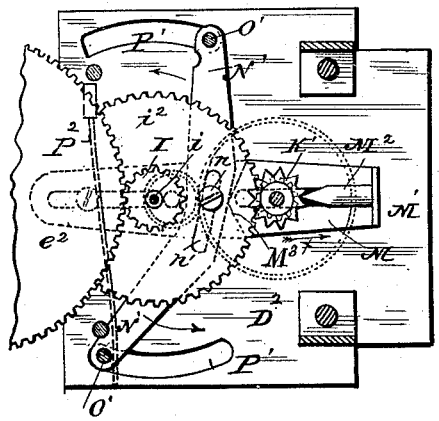
Figure 8:
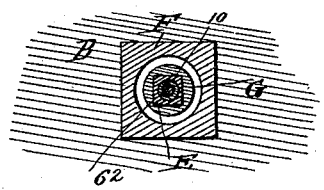
Figure 9:
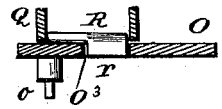

In the accompanying drawings, Figure 1 is a perspective view of my improved table, showing the same open and in its operative condition. Fig. 2 is a side view showing the table with the leaves folded down. Fig. 3 is a central longitudinal section of the upper part of the table. Fig. 4 is an inverted plan view of the table. Fig. 5 is an inverted view of the main table-top. Fig. 6 is a top plan view of the main table-frame with the cover removed. Fig. 7 is a detail horizontal section on the line 7 7, Fig. 3. Fig. 8 is a detail horizontal section on line 3 3, Fig. 3. Figs. 9 and 10 are detail views hereinafter referred to.
I will first proceed to describe my table in a general way, and then specifically point out and describe in detail the several parts and their operative connection.

In the practical construction of my improved table I arrange the body or frame of the main table with a chamber, into which is entered the spring-actuated gearing devices, which devices, by the construction of the framing of the table in a manner as will be described, are concealed from view.

Projecting centrally through the main tabletop is the power-shaft of the train of gears. To this shaft is suitably connected the revolving table, which turns upon the main table. Suitable devices are employed whereby the gearing may be readily thrown into or out of operative position, and which will permit of the revolving of the main table when so desired.

Having thus generally outlined the construction and arrangement of my improvement, I will now proceed to specifically describe the same.

In the drawings, A denotes the main tableframe, which is supported upon the legs $a$ $a$. The frame A is composed of the sides A' A' and ends $A^2$ $A^2$, which sides and ends form the chamber $A^3$.

B denotes the main table-top, which is composed of the central section, B', and the hinge-leaves $B^2$ $B^2$.

Hinged near each end of the table-frame are the folding extensions C, provided with legs $c$. By reference to Figs. 1 and 6 of the drawings it will be noticed that when said extensions are opened out they support the leaves $B^2$ of the table-top, and when closed they fit snugly against the sides of the frame A' and form a part thereof. To permit of the ready adjustment of said extensions and prevent them being turned out too far, I provide each extension C with a segmental rod, C' C', one end of which is secured thereto at $c'$, and the other free end arranged to pass through a slot, $c^2$, in the frame A. The ends $c^3$ of said rods C' are provided with downward projections, which bear against the inside of the frame A' when they are pulled to their outmost position, and thereby limit the outward movement of the extensions C. When said extensions C are closed upon the sides A' of the frame, the rods C' extend inward into the frame A, below the table-top, as shown. Said extensions are securely held in their closed positions by means of the projections 1 upon the sides of the legs $a$, which are engaged by a spring-actuated arm, 2, upon the legs $c$. D denotes a metallic framing, upon which is mounted the spring-actuated gearing devices, which devices, when desired, automatically operate the table. The frame D consists, principally, of the top plate, D', and the bottom plate, $D^2$. This framing is entered into the chamber $A^3$ of the table and is secured to the frame A' in the manner shown in the drawings.

$d$ is the spring-drum shaft, which is provided with the usual pawl-and-ratchet device, $d'$, and has secured upon its lower projecting end, $d^2$, the handle $d^3$, by means of which the spring $d^5$ may be wound up when desired.

$d^4$ is the drive-gear operated by said spring $d^5$, which meshes with a pinion, $e$, mounted upon the operating-shaft E, by means of which motion is imparted thereto. This shaft E is hollow, and has its lower end stepped and supported in the bottom plate, $D^2$, and its upper end is supported in a sleeve, F, connected to and projecting downwardly from the table-top B, as shown in Fig. 3. The upper end, $e'$, of the hollow shaft E is square in cross-section, and projects into a hub, G, also square in cross-section. The upper end of the hub G is formed with a ratchet-plate, $g'$, (see Fig. 10,) which operates and is seated in a recess, $h$, formed centrally in the bottom of the revolving table H. $h'$ is a pawl or stop secured to said table in its recess, which is engaged by the ratchet-plate $g'$ when the hub G is revolved. Said plate is retained in the recess $h$ by means of the plate $G^2$, screwed to the table H, as shown. By this construction it will be observed that when the shaft E is revolved, it, by means of its connection with the hub G, will cause the ratchet-plate $g'$ to turn, which disk, by its connection with the pawl $g$, connected to the table, will cause the table to revolve.

By the arrangement of the hub and ratchet-plate as described the table H may be revolved by hand when desired without the aid of the operating-gear mechanism.

Disposed between the main table-top and the revolving table is a metal wear-plate, J, and friction-rollers $j$ are journaled to the bottom of the table H, which travel on the plate J. The table H, which is composed of the main section H' and the hinged leaves $H^2$, may be turned in the same longitudinal plane with the main table-top B, and the leaves $H^2$ folded down upon the leaves $B^2$ of the table B when the table is not in use, as shown in Fig. 2. The table H is also provided with suitable hand-holds for turning the same when desired.

$e^2$ represents a large gear-wheel mounted on the shaft E, which meshes with a pinion, I, mounted upon a short shaft, $i$, journaled in the plate $D^2$, and a plate, $i'$, of the frame D. The shaft $i$ is also provided with a gear-wheel, $i^2$, which meshes with a pinion, K, upon a shaft, $k$, journaled in the plates $D^2$ and $i'$. K' denotes a spur-wheel mounted upon the shaft K, which shaft extends above the plates $i'$ and carries at its upper end a gear-wheel, $K^2$, which meshes with a pinion, L, upon a shaft, $l$, journaled in the plates D' and $i$ of the frame D, which shaft $l$ is provided with the usual regulator, or fan L, as shown in Fig. 3.

M denotes a plate which is arranged to slide back and forth upon the stud $m$, which projects in the slot $m'$ formed in said plate.

The plate M is formed at one end with a vertical arm or extension, M', which has projecting rearwardly therefrom a finger-piece, $M^2$, arranged to engage with the spur-wheel K'. About centrally upon said plate M is secured a transverse bar, N, which is secured to the plate M by means of a screw-bolt, $n$, passing through an elongated slot, $n'$, in the bar N. At the point where the bar N is secured to the plate M the plate M is formed with the shoulder $M^3$, against which the bar N is adapted to operate in a manner as will be presently described.

Pivoted upon a stud, $o$, (see Fig. 6,) above the plate D' and below the table-top B, is a semicircular plate, O, the outer extended portions, $o'$, of which are provided with downwardly-projecting rods O', which pass through the plates D D', and are connected to the outer ends, N' N', of the bar N, as shown. Segmental slots P' P' are formed in the plates D' $D^2$ to permit of the movement of said rods. A leaf-spring, P, is secured to the plate $i'$ and presses against one of the rods O', and tends to hold the plate O in its normal position.

Referring to Fig. 5 of the drawings, Q denotes a metal box-like frame, which is centrally pivoted to the under side of the table-top in a recess, $b^6$. Pivoted upon a transverse bolt, $q$, at one end, $q'$, of the frame is a plate, R, which plate is provided with a downwardly-projecting beveled lip, $r$. (See Fig. 9.) The frame Q is disposed in such a manner in relation to the plate O that the downwardly-projecting lip $r$ will enter an opening, $O^3$, in the plate O, as shown in Fig. 6.

S denotes a pull-rod, which by means of the cord or wire is connected to one end, $x$, of the frame Q.

T is a leaf-spring arranged to hold the frame Q in its normal position.

While I have described but one pull-rod S, it is manifest that a series of them will be employed in the practical operation of my device, in a manner as will be clearly understood from Fig. 5 of the drawings.

The operation of the construction just described is as follows: When it is desired to revolve the table H, the operator pulls upon the pull-rod S, which movement will swing the frame Q in the direction of the arrow, Fig. 5, and which, through the medium of the projection $r$, turns the plate O in the direction shown by the arrow, Fig. 6. Now, it will be seen by reference to Fig. 7 of the drawings that this movement will cause the ends of the bar N to move in the direction shown by arrows, same figure, which will cause the arm to strike against the shoulder $M^3$, and thereby cause the plate M to slide in the direction shown by arrow X, Fig. 7, which movement will withdraw the finger $M^2$ from the spur-wheel K, and thereby permit the operation of the gearing and the revolving of the table H. When said table H has been turned to the required distance, the operator releases his hold upon the pull-rod S, and spring P forces the bar H and the plate O back to their normal positions, and thereby causes the finger M³ to enter the spur-wheel K and stop the motion of the gear mechanism.

U denotes a plate disposed upon the plate D² of the frame at the opposite side from the plate M, and is provided with a slot encompassing the drum-shaft and with a projecting finger, $u$, at the inner end. The other end of said plate is provided with an upward extension, $u'$, formed with a screw-threaded opening, $u^2$, into which is fitted the screw-shaft V' of the thumb-screw V. Said screw passes through the frame A², and is provided with an annular groove, $v$, into which projects a screw-stud, $v'$. The finger $u$ is arranged to project into the pinion $e$, as shown. Thus it will be seen that when it is desired to throw the gearing mechanism out of operation by turning the thumb-screw to the left the plate U will be forced forward and the finger $u$ caused to enter the pinion $e$, and thus prevent its turning. By turning the thumb-screw in a reverse direction the plate U will be drawn backward and the finger $u$ withdrawn from the pinion $e$, and thereby permit of its turning when so desired.

It is sometimes desirable to revolve the main table-top, which, during the several operations before described of the table, remains in a fixed position. To permit of the top being revolved when so desired, I form the table-top with a central hub portion, W, to which is secured the sleeve F, before described, and which sleeve is securely journaled in the frame D by means of a nut, $f$, as shown. Around this hub I form a circular groove, F', and in the hub a notch, $f^2$. Upon the under side of the plate D' is secured a plate, Y, provided with studs $y$ $y'$ passing through slots in the plate D', as shown in Fig. 3. Upon the stud $y'$ is extended upward a short pintle, $y^2$, upon which is mounted a friction-roller. The pintle $y^2$ with its roller is arranged to normally project into the notch $f^2$ of the hub, and thereby prevent the turning of the top B. The slide-plate Y is held in its normal position by means of the spring $y^4$, pressing against the stud $y$, as seen in Fig. 6. The outer end of the plate Y is provided with a downward projection, in which is secured the end of a thumb screw-rod, Z, which passes through the frame A², as shown.

It will be readily understood that when it is desired to revolve the table-top B the operator, by pulling upon the thumb-rod Z, pulls the pintle $y^2$ and its roller from the socket $f^2$ into the circular groove $f$. Now, when in this position, by giving the table a slight turn to prevent the pintle from entering the notch $f^2$, the table may be readily turned entirely around, if so desired. During this operation the projecting lip $r$ will readily leave the opening in the plate O, owing to its beveled edge, and when the table has been entirely turned around both the lip $r$ and the pintle $y^2$ will again enter into their normal position.

Passing up through the central hollow shaft, E, is a rod, 10, which projects below the plate D², and is provided at its lower end with a pinion, 11, which meshes with a pinion, 15, secured upon the lower projecting end of the shaft $i$. Upon the lower end of shaft $i$ is loosely fitted a plate, 17, which has lateral arms 18 extending radially therefrom, and through the arms 18 pass the lower extended ends of the rods O', and are secured to said arms by the nuts 20. The plate 17 and its connection to the rods O' serve to secure the said rods, and thereby hold them in a secure operative condition.

From the foregoing description, taken in connection with the drawings, the operation and construction of my improvement will be readily understood.

Having thus described my invention, what I claim, and desire to secure by Letters Patent, is—

1. In a self-waiting table, the combination, with the main table-body projections 1 formed thereon, of the extensions C, the rods C', one end of said rods secured to the extensions C, the other end having a stop projection and adapted to fold into the main frame when extensions are closed in, the spring-actuated catch 2, adapted to be engaged and held by the projection 1 upon the main body of the table, substantially as described and shown.

2. In a self-waiting table, essentially as described, the combination, with the shaft E, the hub G, mounted on said shaft, a ratchet-disk, $g'$, formed on said hub, of the revolving table H, and a pawl, $h'$, secured centrally to the table and adapted to be engaged by the ratchet-disk, substantially as shown and described.

3. In a self-waiting table, the combination, with the main frame and table, spring-actuated gearing supported therein and adapted to operate the table, a box-like frame centrally pivoted to the under side of the table-top, and a pawl, R, pivotally secured at one end in the said box, provided with a depending lip, $r$, of the pivoted plate O, provided with a slot, O³, said plate arranged to engage the lip $r$ of the pawl, and rods depending from the plate O and connected with a releasing device connected to the spring-gearing, said device being operated by movement of the plate O and pawl R, substantially as shown and described.

4. In a self-waiting table, the combination, with the operating-gears, of a slide-plate, M, having a projecting finger, M³, adapted to be moved into or out of engagement with the gears, whereby the movement thereof may be stopped, a pivoted plate, O, mounted in the table-frame and connected with the plate M, a box-like frame centrally pivoted to the under side of the table-top, and a pawl, R, pivotally secured at one end in the said box, provided with a depending lip, $r$, adapted to normally engage the plate O and thereby hold said finger M² in engagement with the gearing, and means, substantially as shown and described, for operating the box-like frame and pawl, as and for the purposes hereinbefore described.

5. In a self-waiting table, the combination, with the shaft K, the spur-wheel K', and the intermediate gearing, of the sliding plate M, having a rearwardly-projecting finger adapted to engage the spur-wheel K', and a shoulder, M³, a cross-bar, N, mounted on said plate, arranged to bear against the said shoulder, a pivoted plate, O, connected with the bar N, a box-like frame centrally pivoted upon the under side of the table-top, a pawl, R, pivotally secured at one end in the said box, provided with a projecting finger, r, adapted to engage the plate O, and means, substantially as shown, for operating the pawl R and plate O, as described, for the purpose set forth.

6. The combination, with the plate O, centrally pivoted upon the frame D', said plate provided with depending rods, a plate, M, connected to said rods, said plate provided with a projecting finger for arresting the movement of the operating-gearing devices, and a shoulder, M³, a cross-bar, N, mounted on said plate, arranged to engage the said shoulder, and upwardly-projecting arms connecting said bar N with the plate O, said plate provided with an opening, O³, of the swinging box Q, having a hinged pawl, R, having a beveled projection, r, adapted to enter the opening O³, and means, substantially as shown and described, for swinging said box, whereby the plate O is swung on its pivot and the bar N caused to operate the plate M, as and for the purpose set forth.

7. In a self-waiting table, the combination, with the main frame, spring-actuated gearing supported therein, the plate O, centrally pivoted on the frame D', having an opening, O³, a releasing device, substantially as shown, connected with spring-gearing and with the plate O, the swinging box Q, centrally pivoted upon the under side of the table-top, and a pawl, R, hinged at one end in said box, provided with a downwardly-projecting finger, r, engaging the opening O³ in plate O, of the pull-rod S, mounted in the table-top, its outer end extending beyond the table-rim and its inner end connected to the swinging box, substantially as and for the purpose described.

8. In a self-waiting table, the combination, with the table-top B, provided with a central hub, W, a recess, f², formed in said hub, a circular groove, F', surrounding the hub, of a spring-actuated sliding plate, Y, having an upwardly-projecting hub, y², fitting normally in the recess f², and means, substantially as shown, for withdrawing the projecting hub from the recess f², as and for the purpose described.

9. In a self-waiting table, substantially as described, the combination, with the plate U, having a projecting finger, u, at one end adapted to enter the cog-pinion e, and an upturned portion, u', having a screw-threaded opening, u², at its opposite end, of the thumb-screw V, having a screw-shank adapted to enter the screw-opening, an annular groove, v, engaged by the studs v', and the thumb-screw body passed through the side A² of the frame, substantially as and for the purpose specified.

ANDREW DAHLSTROM.

Witnesses:
CHAS. A. PETTIT,
SOLON C. KEMON.